United States Patent
Nakaho et al.

(10) Patent No.: US 7,903,314 B2
(45) Date of Patent: Mar. 8, 2011

(54) ELECTROCHROMIC MIRROR

(75) Inventors: Junichi Nakaho, Aichi-ken (JP);
Masaharu Hattori, Aichi-ken (JP);
Atsushi Yamaguchi, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 252 days.

(21) Appl. No.: 12/355,701

(22) Filed: Jan. 16, 2009

(65) Prior Publication Data

US 2009/0185256 A1     Jul. 23, 2009

(30) Foreign Application Priority Data

Jan. 23, 2008   (JP) ................... 2008-012517

(51) Int. Cl.
*G02F 1/153* (2006.01)
(52) U.S. Cl. ......... 359/270; 359/265; 359/267; 359/273; 359/275; 359/608
(58) Field of Classification Search ............. 359/265, 359/267, 269, 273–275; 345/105, 107; 252/62.2
See application file for complete search history.

(56) References Cited

U.S. PATENT DOCUMENTS

| | | | | |
|---|---|---|---|---|
| 3,451,741 A | * | 6/1969 | Manos | 359/275 |
| 3,844,636 A | | 10/1974 | Maricle et al. | |
| 4,550,982 A | * | 11/1985 | Hirai | 359/274 |
| 4,909,610 A | * | 3/1990 | Baucke et al. | 359/265 |
| 5,019,420 A | * | 5/1991 | Rauh | 427/126.3 |
| 5,446,577 A | * | 8/1995 | Bennett et al. | 359/273 |
| 5,668,663 A | * | 9/1997 | Varaprasad et al. | 359/608 |
| 7,088,490 B2 | * | 8/2006 | Nakaho et al. | 359/265 |
| 7,372,610 B2 | * | 5/2008 | Burdis et al. | 359/265 |
| 7,403,319 B2 | * | 7/2008 | Leyland et al. | 359/268 |
| 7,643,201 B2 | * | 1/2010 | Nakaho et al. | 359/270 |
| 7,692,843 B2 | * | 4/2010 | Nakaho et al. | 359/267 |
| 7,746,533 B2 | * | 6/2010 | Sotzing et al. | 359/265 |
| 7,800,807 B2 | * | 9/2010 | Nakaho et al. | 359/265 |

FOREIGN PATENT DOCUMENTS

| | | |
|---|---|---|
| EP | 1 591 827 A1 | 11/2005 |
| EP | 1 635 212 A1 | 3/2006 |
| JP | 2005-321521 A | 11/2005 |
| WO | 94/16356 A1 | 7/1994 |

OTHER PUBLICATIONS

European Search Report dated Apr. 29, 2009 from corresponding European Patent Application No. 09 15 0928.

* cited by examiner

*Primary Examiner* — Loha Ben

(74) *Attorney, Agent, or Firm* — Roberts Mlotkowski Safran & Cole P.C.

(57) ABSTRACT

In an electrochromic mirror, an insulating film is disposed between a conductive reflective film and an electrolytic solution and the conductive reflective film and the electrolytic solution are electrically insulated from each other except inside of insulating film side small holes. Accordingly, in a portion where the insulating film side small holes are not formed, the conductive reflective film does not come into contact with the electrolytic solution, as the result, a ferrocene ion is not reduction-reacted. Thereby, a current is very effectively suppressed from steadily flowing between the conductive film and the conductive reflective film due to repetition of a redox reaction of ferrocene, resulting in very effectively suppressing a voltage from dropping due to the current.

11 Claims, 2 Drawing Sheets

ELECTROCHROMIC MIRROR

CROSS-REFERENCE TO RELATED APPLICATION

This application claims priority under 35 USC 119 from Japanese Patent Application No. 2008-012517, the disclosure of which is incorporated by reference herein.

BACKGROUND

1. Field of the Invention

The present invention relates to an electrochromic mirror that is used for, for instance, for rear-view, an outer mirror or an inner mirror of a vehicle and capable of varying the reflectance by applying a voltage thereto.

2. Description of the Related Art

As a vehicular outer mirror or inner mirror, an electrochromic mirror (in some cases, referred to as an "anti-glare mirror") is used that varies the transmittance of light incident on a reflective film or light reflected by that an electrochromic film formed on a surface of the reflective film is colored.

In the electrochromic mirror like this, an electrochromic film is formed of tungsten trioxide or the like. Furthermore, in this kind of electrochromic mirror, a cell in which an electrolytic solution including lithium ions is encapsulated between a pair of electrodes is used. When a predetermined voltage is applied between electrodes of the cell to occur reduction reaction for tungsten trioxide with lithium ions in the electrolytic solution and electrons fed from the electrode, the electrochromic film is colored substantially blue.

In the electrolytic solution in the cell, other than lithium ions, ferrocene and the like is included as oxidation-reduction (redox) agent. When a predetermined voltage is applied between a pair of electrodes as mentioned above, ferrocene is oxidized at an anode of the pair of electrodes to form a positive ferrocene ion. The ferrocene ion is, upon reaching a cathode of the pair of electrodes, reduction-reacted (reduced) to return to ferrocene.

When the oxidation reaction and reduction reaction of the ferrocene like this are repeated, a steady current flows between the electrodes. On center sides of the respective electrodes, a current such as mentioned above in the circumference flows to cause a voltage drop; as a result, a portion corresponding to the center side (that is, center side of the cell) of the respective electrodes in the electrochromic film is not sufficiently colored in some cases.

One measure for solving such a phenomenon is disclosed in JP-A No. 2005-321521 (a patent document 1). In the patent document 1, when respective values of the electric conductivity σ of the electrolytic solution that constitutes an electrochromic cell used for an electrochromic mirror, an area resistance value R of a pair of electrodes, a length L of the electrodes and a distance h between electrodes are set so that a numerical value α obtained when these values are inserted in a formula (1) below is 2 or less, uniformity of a distribution of a voltage applied to the electrolytic solution is improved.

$$\alpha = (\sigma \cdot R/h)^{1/2} \quad (1)$$

However, there are restrictions on material of electrode and electrolytic solution, electrode dimension based on dimensions of the respective portions as a whole of mirror, and the like. As the result, it is practically difficult to set the above mentioned respective values so that a value of α that is a calculation result of the formula (1) is 2 or less.

SUMMARY OF THE INVENTION

The present invention, in view of the above facts, intends to obtain an electrochromic mirror in which an electrochromic film is sufficiently colored without suffering from restrictions based on material of electrode and electrolytic solution and dimensions of the respective portions of the respective members.

An electrochromic mirror of a first aspect of the present invention is an electrochromic mirror in which an electrolytic material including a predetermined ion and an oxidation-reduction agent is enclosed between an anode and a cathode, and when a voltage is applied between the anode and the cathode, a reduction reaction is caused between the predetermined ion and an electrochromic film to color the electrochromic film, whereby transmittance of light of the electrochromic film is varied to vary reflectance of light of the electrochromic mirror, the electrochromic mirror including: a reduction reaction suppressing member that, in a state where the voltage is applied, permits the predetermined ion to reach the electrochromic film; and suppresses the oxidation-reduction agent that has been oxidized at the anode due to application of the voltage from being subject to reduction reaction at the cathode.

According to the electrochromic mirror of the first aspect of the invention, when the voltage is applied between the anode and the cathode, the predetermined ions constituting the electrolytic material reach the electrochromic film and thereby the reduction reaction is caused between the electrochromic film and the predetermined ions constituting the electrolytic material. The electrochromic film is colored by the reduction reaction of the electrochromic film. When the electrochromic film is colored like this, the light transmittance of the electrochromic film is varied therefore the light reflectance is varied.

The redox agent (the oxidation-reduction agent) is contained in the electrolytic material and when the voltage is applied between the anode and the cathode, the redox agent is oxidized at the anode. Thereby, reactions are stabilized as a whole. In the electrochromic mirror of the aspect of the invention, even when the redox agent is oxidized at the anode as mentioned above, the reduction reaction suppressing member suppresses the oxidized redox agent from being reduction-reacted (reduced) in the cathode.

Thereby, a steady current that flows in the electrolytic material between the anode and the cathode due to repetition of oxidation and reduction of the redox agent is suppressed from occurring. When the steady current like this is suppressed from occurring, a partial voltage drop between the anode and the cathode is suppressed, accordingly, when the voltage drop is suppressed like this, partial deficiency in the coloring in the electrochromic film is suppressed from occurring. Furthermore, in the aspect of the invention, since the reduction reaction suppressing member suppresses the oxidized redox agent from being reduction-reacted (reduced), dimensions of the respective portions of the electrochromic mirror including magnitude and a gap of the anode and the cathode and the like are not particularly restricted.

In the aspect of the invention, the reduction reaction suppressing member may well if the reduction reaction suppressing member resultantly makes the reduction reaction smaller in comparison with a case where the oxidized redox agent is reduction-reacted (reduced) at the cathode when the reduction reaction suppressing member is not provided. Furthermore, the reduction reaction suppressing member may be constituted so as to inhibit the oxidized redox agent from being reduction-reacted (reduced).

That is, in the aspect of the invention, the "suppressing" of the reduction reaction of the oxidized redox agent includes "inhibition (prevention)" of a reduction reaction of the oxidized redox agent. Accordingly, a reduction reaction inhibiting member that inhibits a redox agent oxidized at the anode when the voltage is applied between the anode and the cathode from being reduction-reacted (reduced) at the cathode is included in the reduction reaction suppressing member that constitutes the aspect of the invention.

According to the electrochromic mirror of the second aspect of the invention, in the first aspect of the invention, the electrochromic mirror further includes: a conductive reflective film that reflects light from a front side where the electrochromic film is provided, permits the predetermined ion to permeate and constitutes the cathode; and an insulating film that is interposed between the conductive reflective film and the electrolytic material on a back side of the conductive reflective film, permits the predetermined ion to permeate and has an electric insulating property, wherein the reduction reaction suppressing member includes the insulating film.

In the electrochromic mirror of the second aspect of the invention, light incident on the surface on the front side of the conductive reflective film after going through the electrochromic film is reflected at the conductive reflective film. Furthermore, the conductive reflective film permits the predetermined ions, that color the electrochromic film by reduction reacting with the electrochromic film, to permeate, and further, the insulating film disposed on the back side of the conductive reflective film as well permits the predetermined ions to permeate.

As the result, when the voltage is applied between the conductive reflective film that constitutes the cathode and the anode, the predetermined ions constituting the electrolytic material permeate through both the insulating film and the conductive reflective film to reach the electrochromic film. Thereby, at the electrochromic film, a reduction reaction is occurred and thereby the electrochromic film is colored.

Herein, the insulating film interposed between the conductive reflective film constituting the cathode and the electrolytic material has electric insulating properties; accordingly, even when the redox agent is oxidized at the anode, the oxidized redox agent is not reduction-reacted (reduced) or the oxidized redox agent is effectively suppressed from being reduction-reacted (reduced).

According to the electrochromic mirror of a third aspect of the invention, in the invention of the second aspect, reflective film side small holes that communicate the front side and the back side of the conductive reflective film are formed in the conductive reflective film so as to permit the predetermined ion to permeate the conductive reflective film.

In the electrochromic mirror of the third aspect of the invention, many reflective film side small holes are formed in the conductive reflective film. The reflective film side small holes communicate the front side (that is, a side on which the electrochromic film is disposed) and the back side (that is, a side on which the insulating film is disposed) of the conductive reflective film and permit the predetermined ions that reduction react with the electrochromic film to color the electrochromic film to permeate.

Accordingly, when the voltage is applied between the anode and the conductive reflective film, the predetermined ions that have gone through the insulating film go through many reflective film side small holes formed in the conductive reflective film and readily reach the electrochromic film. Thereby, a smooth reduction reaction is occurred at the electrochromic film and thereby the electrochromic film is colored.

According to the electrochromic mirror of a fourth aspect of the invention, in the third aspect of the invention, insulating film side small holes that communicate a front side and a back side of the insulating film are formed in the insulating film so as to permit the predetermined ion to permeate the insulating film, the insulating film side small holes communicating with the reflective film side small holes at a side of the conductive reflective film.

In the electrochromic mirror of the fourth aspect of the invention, many insulating film side small holes are formed in the insulating film. The insulating film side small holes communicate the front side (that is, a side of the conductive reflective film) and the back side (that is, a side on which the electrolytic material is provided) of the insulating film and permit the predetermined ions that reduction react with the electrochromic film to color the electrochromic film to permeate.

Therefore, when the voltage is applied between the anode and the conductive reflective film, the predetermined ions go through many insulating film side small holes formed in the insulating film and readily reach the side of the conductive reflective film. Furthermore, the insulating film side small holes communicate with the reflective film side small holes formed in the conductive reflective film on the side of the conductive reflective film. Accordingly, the predetermined ions that have gone through the insulating film side small holes further go through the reflective film side small holes of the conductive reflective film and readily reach the electrochromic film. Thereby, a smooth reduction reaction is occurred at the electrochromic film to color the electrochromic film.

Since the insulating film side small holes are formed in the insulating film, there is a possibility that the redox agent oxidized at the anode may reach the conductive reflective film through the insulating film side small holes. However, in a portion where the insulating film side small holes are not formed, the insulating film is interposed between the conductive reflective film and the electrolytic material; accordingly, the oxidized redox agent is very effectively suppressed from being reduction-reacted (reduced).

According to the electrochromic mirror of a fifth aspect of the invention, in the third aspect of the invention, the insulating film is conductive with respect to the predetermined ion but is not conductive with respect to the oxidation-reduction agent that has been oxidized.

According to the electrochromic mirror of a sixth aspect of the invention, in the second aspect of the invention, the electrochromic mirror further includes: a conductive film that constitutes the anode, wherein the electrolytic material is enclosed between the insulating film and the conductive film.

According to the electrochromic mirror of a seventh aspect of the invention, in the third aspect of the invention, the reflective film side small holes have an inner diameter of 20 µm or less.

According to the electrochromic mirror of an eighth aspect of the invention, in the fourth aspect of the invention, the reflective film side small holes and the insulating film side small holes have an inner diameter of 20 µm or less.

An electrochromic mirror of a ninth aspect of the present invention is an electrochromic mirror in which an electrolytic material including a predetermined ion and an oxidation-reduction agent is enclosed between an anode and a cathode, and when a voltage is applied between the anode and the cathode, a reduction reaction is caused between the predetermined ion and an electrochromic film to color the electrochromic film, whereby transmittance of light of the electrochromic film is varied to vary reflectance of light of the electrochromic mirror, the electrochromic mirror including: a conductive reflective film that reflects light from a front side where the electrochromic film is provided, permits the predetermined ion to permeate and constitutes the cathode; an insulating film that is interposed between the conductive reflective film and the electrolytic material on a back side of the conductive reflective film, permits the predetermined ion to permeate and has an electric insulating property; and a conductive film that constitutes the anode; wherein, reflective film side small holes that communicate the front side and the back side of the conductive reflective film are formed in the conductive reflective film so as to permit the predetermined ion to permeate the conductive reflective film, and in a state where the voltage is applied, the predetermined ion is permitted to reach the electrochromic film via the reflective film side small holes and the insulating film, and the insulating film suppresses the oxidation-reduction agent that has been oxidized at the anode due to application of the voltage from being subject to reduction reaction at the cathode.

According to the electrochromic mirror of a tenth aspect of the invention, in the ninth aspect of the invention, insulating film side small holes that communicate a front side and a back side of the insulating film are formed in the insulating film so as to permit the predetermined ion to permeate the insulating film, the insulating film side small holes communicating with the reflective film side small holes at a side of the conductive reflective film.

According to the electrochromic mirror of an eleventh aspect of the invention, in the ninth aspect of the invention, the insulating film is conductive with respect to only the predetermined ion.

In the electrochromic mirror of the fifth aspect of the invention, when the voltage is applied between the anode and the conductive reflective film, the predetermined ions go through the insulating film and readily reach the side of the conductive reflective film. Accordingly, the predetermined ions further go through the reflective film side small holes of the conductive reflective film and readily reach the electrochromic film. Thereby, a smooth reduction reaction is occurred at the electrochromic film to color the electrochromic film.

Here, the insulating film is interposed between the conductive reflective film and the electrolytic material, therefore, the oxidation-reduction agent that has been oxidized cannot go through the insulating film, accordingly, the oxidized redox agent is very effectively suppressed from being reduction-reacted (reduced).

In the electrochromic mirror of the sixth to the eleventh aspect of the invention, the similar effects of the above mentioned the first to the fifth aspects can be obtained.

As described above, the electrochromic mirror involving of the aspect of the invention enables to sufficiently color the electrochromic film without suffering from restrictions based on material of electrode and electrolytic solution and dimensions of the respective portions of the respective members.

BRIEF DESCRIPTION OF THE DRAWINGS

Embodiments of the invention will be described in detail with reference to the following figures, wherein.

DETAILED DESCRIPTION OF THE INVENTION

Configuration of First Embodiment

Figure 1:
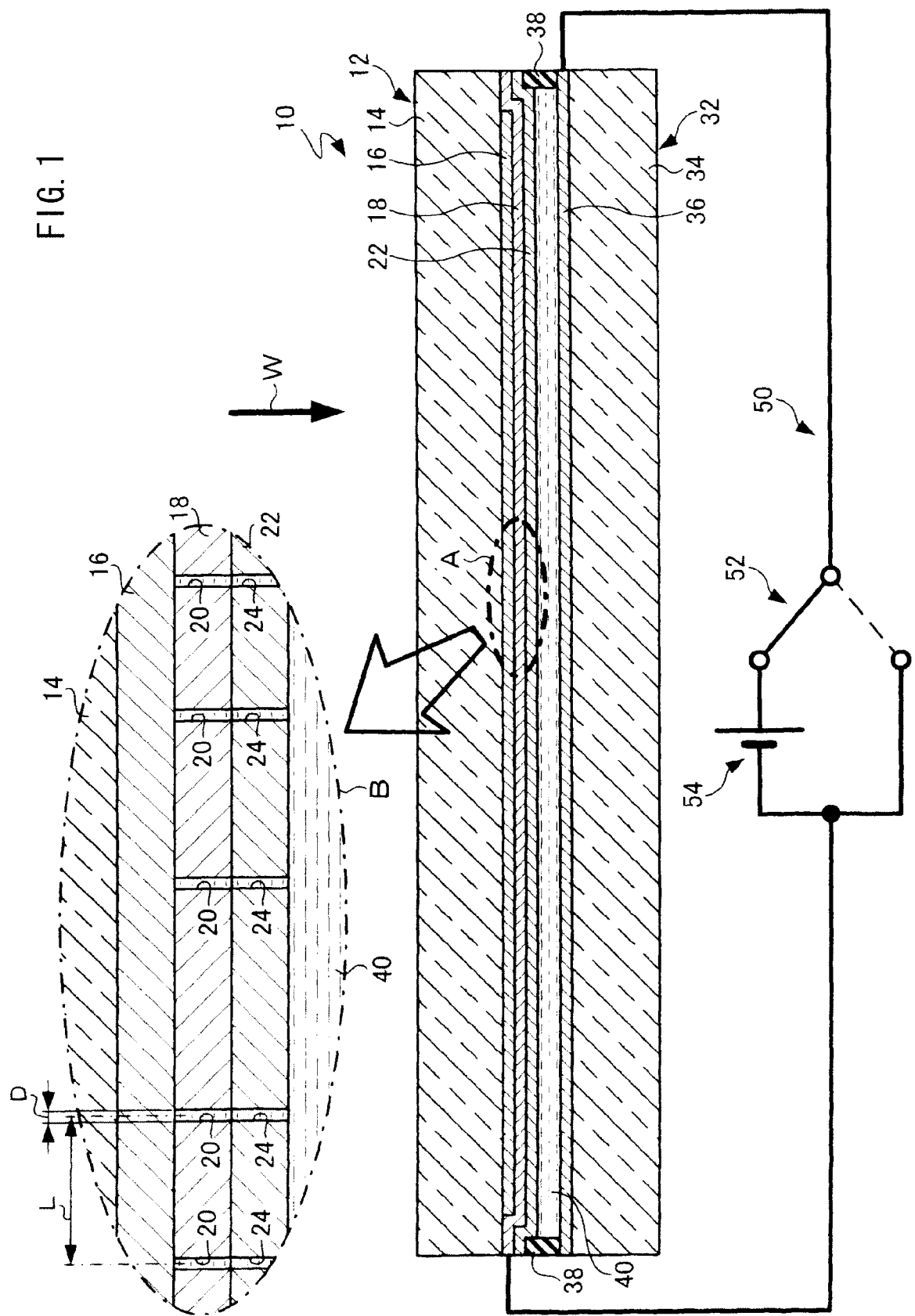
FIG. 1 is schematic sectional view of an electrochromic mirror involving a first embodiment of the invention and an ellipse B depicted with a chain line in the drawing shows a portion of an ellipse A depicted with a chain line in the drawing by enlargement.

FIG. 1 shows a configuration of an electrochromic mirror 10 of a first embodiment of the invention with a schematic sectional view.

As shown in the drawing, an electrochromic mirror 10 includes a surface side substrate 12. The surface side substrate 12 includes a transparent substrate body 14 formed of glass or the like. On a surface on one side (a direction shown with an arrow mark W in FIG. 1) in a thickness direction of the substrate body 14, an electrochromic film 16 is formed. The electrochromic film 16 is formed of, for instance, tungsten trioxide ($WO_3$), molybdenum trioxide ($MoO_3$) or a mixture including such oxide. In particular, in the embodiment, the electrochromic film 16 is formed of tungsten trioxide.

A thickness of the electrochromic film 16 along a thickness direction of the substrate body 14 is set in the range of 300 nm or more and 1000 nm or less and particularly in the embodiment a thickness of the electrochromic film 16 is set at 500 nm. On a surface on a side opposite from the substrate body 14 of the electrochromic film 16, a conductive reflective film 18 that constitutes a reflective film of the electrochromic mirror 10 and that constitutes an electrode as a cathode is formed. The conductive reflective film 18 has the conductivity and is formed of a metal that permits a lithium ion to permeate and has the glossiness such as rhodium (Rh), ruthenium (Ru), palladium (Pd) or nickel (Ni). A thickness of the conductive reflective film 18 along a thickness direction of the substrate body 14 is set in the range of 30 nm or more and 200 nm or less. In particular, in the embodiment, the thickness of the conductive reflective film 18 is set at 50 nm.

Furthermore, in an ellipse B depicted with a chain line in FIG. 1, a schematic sectional view obtained by further enlarging a portion of an ellipse A depicted with a chain line is shown. As shown therein, many fine reflective film side small holes 20 that penetrate in a thickness direction through the conductive reflective film 18 are formed. The reflective film side small holes 20 have an inner diameter (diameter of an inner periphery portion) dimension D of 20 μm or less and are set, in particular in the embodiment, at 0.5 μm. Furthermore, the reflective film side small holes 20 are fundamentally formed irregularly (at random) in the conductive reflective film 18. However, the reflective film side small holes 20 are formed such that a center-to-center distance L of adjacent reflective film side small holes 20 is set at 20 μm or less and preferably at 10 μm or less and in particular in the embodiment at 5 μm or less. The reflective film side small holes 20 are formed such that a ratio of an inner diameter (diameter of an inner periphery portion) dimension D and a center-to-center distance L of adjacent reflective film side small holes 20 is set at 7 or more.

On a surface on a side opposite from the electrochromic film 16 of the conductive reflective film 18, an insulating film 22 is formed as a reduction reaction suppressing member. The insulating film 22 has the electrical insulating properties and is used a fluoride or an oxide such as aluminum oxide (so-called "alumina", $Al_2O_3$), silicon dioxide (so-called "silica", $SiO_2$), tantalum oxide ($Ta_2O_5$), rutile-type titanium oxide ($TiO_2$), magnesium fluoride ($MgF_2$) or lithium fluoride (LiF).

The insulating film 22 is formed on a surface side substrate 12 on which the electrochromic film 16 and the conductive reflective film 18 are formed by, for instance, deposition or sputtering. In the insulating film 22, many fine insulating film side small holes 24 penetrated through in a thickness direction thereof are formed. The insulating film side small holes 24 penetrate through the insulating film 22 in a thickness direction thereof. Furthermore, the insulating film side small holes 24 are formed fundamentally corresponding to the reflective film side small holes 20, opening ends on a side of the conductive reflective film 18 of the insulating film side small holes 24 and opening ends on a side of the insulating film 22 of the reflective film side small holes 20 are connected, and thereby the insulating film side small holes 24 communicate with the reflective film side small holes with each other. The insulating film side small holes 24 also have an inner diameter (diameter of an inner periphery portion) dimension D of 20 μm or less and are set, in particular in the embodiment, at 0.5 μm.

The above-mentioned reflective film side small holes 20 and insulating film side small holes 24 are formed in such a manner that an insulating film 22 on which a photoresist is coated is exposed via a photo mask in which a pattern of the insulating film side small holes 24 is printed, thereafter the photoresist corresponding to the insulating film side small holes 24 is removed and an etching solution is used to dissolve the insulating film 22 and the conductive reflective film 18.

On the one side in a thickness direction of the surface side substrate 12 having the above-mentioned configuration, a back side substrate 32 is disposed so as to face the front side substrate 12. The back side substrate 32 includes a transparent substrate body 34 formed of glass or the like. On the other side in a thickness direction of the substrate body 34, that is, on a surface on a side of the front side substrate 12, a conductive film 36 that constitutes an electrode as an anode is formed. The conductive film 36 is formed of a metal such as chromium (Cr) or nickel (Ni), indium tin oxide ($In_2O_3$:Sn, so-called "ITO") or tin oxide ($SnO_2$), fluorine-doped tin oxide ($SnO_2$:F), zinc oxide ($ZnO_2$) or a mixture thereof.

A predetermined gap is formed between thus configured front side substrate 12 and back side substrate 32, and a gap between an outer periphery portion of the front side substrate 12 and an outer periphery portion of the back side substrate 32 is sealed with a sealant 38. An electrolytic solution 40 as an electrolyte is encapsulated in a space surrounded by the front side substrate 12, back side substrate 32 and sealant 38. The electrolytic solution 40 includes a solvent formed of propylene carbonate, ethylene carbonate, butylene carbonate, diethyl carbonate, γ-butylolactone, dimethyl formamide or a mixture thereof and in particular in the embodiment propylene carbonate is used as a solvent.

Other than such solvent, the electrolytic solution 40 includes lithium perchlorate ($LiClO_4$), lithium hexafluorophosphate ($LiPF_6$), lithium tetrafluoroborate ($LiBF_4$), lithium bis(trifluoromethanesulfonyl) imide ($LiN(SO_2CF_3)_2$), lithium bis(pentafluoroethanesulfonyl)imide ($LiN(SO_2C_2F_5)_2$), lithium trifluoromethane sulfonate ($LiCF_3SO_3$) or a mixture thereof as an electrolyte and in particular in the embodiment lithium perchlorate is used as an electrolyte, thereby lithium ions are included in the electrolytic solution 40. Furthermore, the electrolytic solution 40 includes ferrocene ($Fe(C_5H_5)_2$) as a redox agent and sulfuric acid as a hydrogen ion agent.

The conductive film 36 of thus configured electrochromic mirror 10 is connected to a switch 52 that constitutes a circuit 50. In the switch 52, a positive electrode of a DC power source 54, that is constituted of a battery mounted on a vehicle and has a rated voltage of substantially 1.3 V, is connected to a terminal that is connected in an ON-state. A negative electrode of the DC power source 54 is connected to the conductive reflective film 18. Furthermore, a terminal to which the switch 52 is connected in an OFF-state is connected to the conductive reflective film 18 without involving the DC power source 54, and in an OFF-state, the conductive film 36 and the conductive reflective film 18 are short-circuited.

Operation and Effect of First Embodiment

Operations and effects of the embodiment will be described.

According to the electrochromic mirror 10 having above-mentioned configuration, the electrochromic film 16 is substantially transparent in an OFF-state of the switch 52. Accordingly, light incident from a side opposite from the electrochromic film 16 of the substrate body 14 goes through (permeates) the substrate body 14 and the electrochromic film 16 and is reflected at the conductive reflective film 18. Furthermore, the light reflected at the conductive reflective film 18 goes through the electrochromic film 16 and the substrate body 14.

On the other hand, when the switch 52 is switched to an ON-state and thereby a voltage having a predetermined magnitude is applied between the conductive film 36 and the conductive reflective film 18, electrons ($e^-$) moved to a side of the conductive reflective film 18 in the circuit 50 intrude from the conductive reflective film 18 into the electrochromic film 16. Further, when the switch 52 is switched to an ON-state, lithium ions ($Li^+$) constituting an electrolyte of the electrolytic solution 40 go through the insulating film side small holes 24, further go through the reflective film side small holes 20 connected to the insulating film side small holes 24 and intrude into the electrochromic film 16. Thereby, in the electrochromic film 16, a reduction reaction of a formula 2 below is occurred to form blue-colored $Li_xWO_3$ so-called as tungsten bronze in the electrochromic film 16.

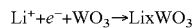

$$Li^+ + e^- + WO_3 \rightarrow Li_xWO_3 \qquad \text{(Formula 2)}$$

By thus coloring the electrochromic film 16 blue, the reflectance becomes lowered in comparison with that before the electrochromic film 16 is colored.

When the electrochromic mirror 10 like this is used in, for instance, a mirror body such as a inner mirror (room mirror) or outer mirror (door mirror and fender mirror) for rearview in a vehicle, in the day time, the switch 52 is maintained in an OFF-state and the rearview is possible at high reflectance, and in the night time, when a headlight of a vehicle running behind is in a lighting state, the switch 52 is switched to an ON-state to color the electrochromic film 16 to lower the reflectance, thereby reflected light from the headlight is reduced to lower the glare.

Furthermore, in the embodiment, the inner diameter (diameter of inner periphery portion) dimension D of the reflective film side small holes 20 is set at 0.5 μm (that is, 20 μm or less); accordingly, fundamentally, the reflective film side small holes 20 are not directly viewed with eyes. As the result, even when the reflective film side small holes 20 are formed, light reflected from the electrochromic mirror 10 does not visually generate unpleasant feeling.

Furthermore, in the embodiment, a ratio of the inner diameter dimension D of the reflective film side small holes 20 and a center-to-center distance L of adjacent reflective film side small holes 20 is set at 7 or more and a ratio of the center-to-center distance L and the inner diameter dimension D, that is, an inverse number of the above ratio, is set at 0.5 or less. Accordingly, irrespective of formation of the reflective film side small holes 20, in addition to that the reflectance is inhibited from deteriorating and light is sufficiently reflected at the conductive reflective film 18, light scattering caused by a diffraction phenomenon of light at a boundary of the reflective film side small holes 20 is effectively reduced very much, and a reflected image formed by reflected light is prevented or effectively suppressed from causing light interference or clouding.

Now, when a voltage having the predetermined magnitude is applied between the conductive film 36 and the conductive reflective film 18 as mentioned above, ferrocene included in the electrolytic solution 40 is oxidized in the vicinity of the conductive film 36 that is the anode to become a positive ferrocene ion as shown by a formula (3) below.

$$Fe(C_5H_5)_2 - e^- \rightarrow [Fe(C_5H_5)_2]^+ \quad \text{(Formula 3)}$$

The positive ferrocene ion is reduction-reacted (reduced) at the cathode to return to original ferrocene and when the oxidation and reduction are repeated a steady current flows between the anode and the cathode.

Herein, in the electrochromic mirror 10, the insulating film 22 is formed between the conductive reflective film 18 that is the cathode of electrode and the electrolytic solution 40, and a portion between the conductive reflective film 18 and the electrolytic solution 40 is electrically insulated except the insides of the insulating film side small holes 24. Accordingly, reduction reaction occurs, that is, the ferrocene ion returns to ferrocene in a portion of the insulating film side small holes 24 and reflective film side small holes 20, however, in a portion where the insulating film side small holes 24 are not formed, the electrolytic solution 40 does not come into contact with the conductive reflective film 18; accordingly, reduction reaction of ferrocene ion does not occur.

As the result, since a reduction reaction where a ferrocene ion returns to ferrocene is very effectively suppressed as a whole, a current is very effectively prevented from steadily flowing due to repetition of oxidation-reduction reaction of ferrocene between the conductive film 36 and the conductive reflective film 18. Thereby, a partial voltage drop between the conductive film 36 and the conductive reflective film 18 caused by a steady current flow between the conductive film 36 and the conductive reflective film 18 is very effectively suppressed, resulting in uniformly coloring the electrochromic film 16.

Furthermore, like this, in the electrochromic mirror 10, by the insulating film 22, repeating of oxidation-reduction reaction of ferrocene is suppressed; accordingly, the electric conductivity of the electrolytic solution 40 doe not restrict magnitudes (dimensions) of the conductive film 36 and conductive reflective film 18 and a distance between the conductive film 36 and the conductive reflective film 18. As the result, a magnitude of the electrochromic mirror 10 and the like is freely set.

Configuration of Second Embodiment

Next, a second embodiment of the invention will be described. In describing the embodiment, regarding portions substantially same as the first embodiment, same reference numerals are given and detailed descriptions thereof are omitted.

Figure 2:
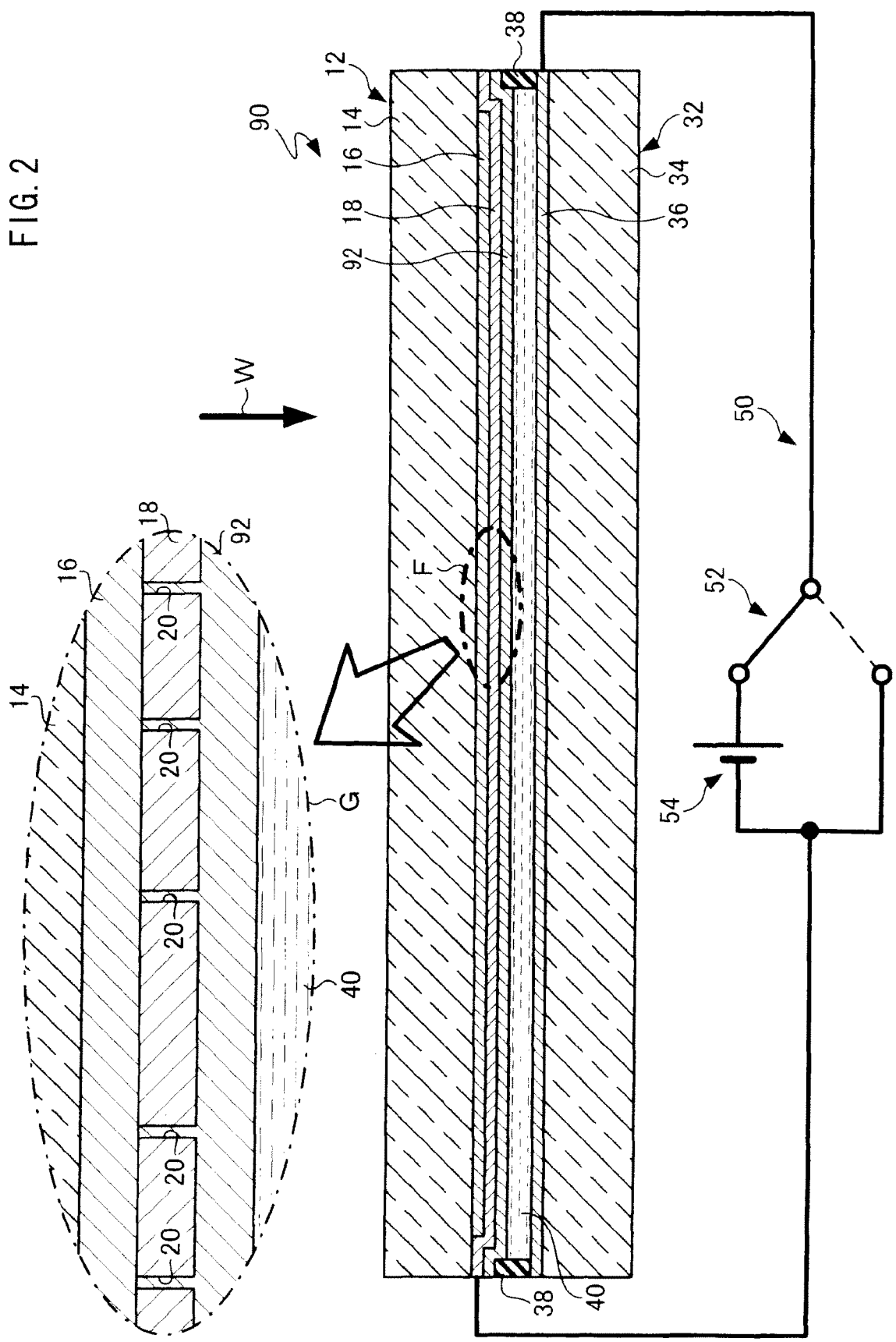
FIG. 2 is schematic sectional view of an electrochromic mirror involving a second embodiment of the invention and an ellipse G depicted with a chain line in the drawing shows a portion of an ellipse F depicted with a chain line in the drawing by enlargement.

FIG. 2 shows a schematic sectional view of a configuration of an electrochromic mirror 90 of the embodiment.

As shown in the drawing, the electrochromic mirror 90 does not have the insulating film 22, and in place of the insulating film 22, a lithium ion conductive film 92 that is one aspect of the insulating film as a reduction reaction suppressing member is provided.

The Li ion conductive film 92 is formed of an inorganic material that has the electrical insulating properties but permits the Li ions to permeate such as lithium nitride ($LiN_3$), lithium fluoride (LiF), magnesium fluoride ($MgF_2$), tantalum oxide ($Ta_2O_5$) or lithium aluminum tetrafluoride ($LiAlF_4$), or a material obtained by introducing a lithium salt such as lithium perchlorate ($LiClO_4$) in a polymer such as PMMA (polymethyl methacrylate) or PEO (polyethylene oxide).

In an ellipse G depicted with a chain line in FIG. 2, a schematic sectional view obtained by enlarging a portion of an ellipse F depicted with a chain line is shown. As shown herein, the insulating film side small holes 24 are not formed in the lithium ion conductive film 92 different from the insulating film 22 in the first embodiment, and reflective film side small holes 20 formed in the conductive reflective film 18 are buried by the lithium ion conductive film 92.

Operation and Effect of Second Embodiment

In thus-configured embodiment, although the insulating film side small holes 24 are not formed in the lithium ion conductive film 92, lithium ions go through the lithium ion conductive film 92 when a voltage is applied between the conductive film 36 and the conductive reflective film 18. Furthermore, since the lithium ion conductive film 92 has the electrical insulating properties, even when ferrocene included in the electrolytic solution 40 is oxidized in the vicinity of the conductive film 36 that is the anode, the electrolytic solution 40 and the conductive reflective film 18 are electrically insulated from each other; that is, ferrocene that is oxidized cannot receive electron from the conductive reflective film 18, accordingly, reduction reaction of positive ferrocene ion does not occur at the conductive reflective film 18.

That is, in the embodiment, although the lithium ion conductive film 92 is used in place of the insulating film 22, operations same as that of the first embodiment are exerted and thereby effects same as that of the first embodiment are obtained.

What is claimed is:

1. An electrochromic mirror in which an electrolytic material including a predetermined ion and an oxidation-reduction agent is enclosed between an anode and a cathode, and when a voltage is applied between the anode and the cathode, a reduction reaction is caused between the predetermined ion and an electrochromic film formed on the cathode to color the electrochromic film, whereby transmittance of light of the electrochromic film is varied to vary reflectance of light of the electrochromic mirror, the electrochromic mirror comprising:

a reduction reaction suppressing member that, in a state where the voltage is applied, permits the predetermined ion to reach the electrochromic film; and suppresses the oxidation-reduction agent that has been oxidized at the anode due to application of the voltage from being subject to reduction reaction at the cathode.

2. The electrochromic mirror of claim 1, further comprising:

a conductive reflective film that reflects light from a front side where the electrochromic film is provided, permits the predetermined ion to permeate and constitutes the cathode; and an insulating film that is interposed between the conductive reflective film and the electrolytic material on a back side of the conductive reflective film, permits the predetermined ion to permeate and has an electric insulating property, wherein the reduction reaction suppressing member includes the insulating film.

3. The electrochromic mirror of claim 2, wherein reflective film side small holes that communicate the front side and the back side of the conductive reflective film are formed in the conductive reflective film so as to permit the predetermined ion to permeate the conductive reflective film.

4. The electrochromic mirror of claim 3, wherein insulating film side small holes that communicate a front side and a back side of the insulating film are formed in the insulating film so as to permit the predetermined ion to permeate the insulating film, the insulating film side small holes communicating with the reflective film side small holes at a side of the conductive reflective film.

5. The electrochromic mirror of claim 4, wherein the reflective film side small holes and the insulating film side small holes have an inner diameter of 20 µm or less.

6. The electrochromic mirror of claim 3, wherein the insulating film is conductive with respect to the predetermined ion but is not conductive with respect to the oxidation-reduction agent that has been oxidized.

7. The electrochromic mirror of claim 3, wherein the reflective film side small holes have an inner diameter of 20 µm or less.

8. The electrochromic mirror of claim 2, further comprising:
a conductive film that constitutes the anode,
wherein the electrolytic material is enclosed between the insulating film and the conductive film.

9. An electrochromic mirror in which an electrolytic material including a predetermined ion and an oxidation-reduction agent is enclosed between an anode and a cathode, and when a voltage is applied between the anode and the cathode, a reduction reaction is caused between the predetermined ion and an electrochromic film formed on the cathode to color the electrochromic film, whereby transmittance of light of the electrochromic film is varied to vary reflectance of light of the electrochromic mirror, the electrochromic mirror comprising:

a conductive reflective film that reflects light from a front side where the electrochromic film is provided, permits the predetermined ion to permeate and constitutes the cathode;

an insulating film that is interposed between the conductive reflective film and the electrolytic material on a back side of the conductive reflective film, permits the predetermined ion to permeate and has an electric insulating property; and a conductive film that constitutes the anode;
wherein,
reflective film side small holes that communicate the front side and the back side of the conductive reflective film are formed in the conductive reflective film so as to permit the predetermined ion to permeate the conductive reflective film, and in a state where the voltage is applied, the predetermined ion is permitted to reach the electrochromic film via the reflective film side small holes and the insulating film, and the insulating film suppresses the oxidation-reduction agent that has been oxidized at the anode due to application of the voltage from being subject to reduction reaction at the cathode.

10. The electrochromic mirror of claim 9, wherein insulating film side small holes that communicate a front side and a back side of the insulating film are formed in the insulating film so as to permit the predetermined ion to permeate the insulating film, the insulating film side small holes communicating with the reflective film side small holes at a side of the conductive reflective film.

11. The electrochromic mirror of claim 9, wherein the insulating film is conductive with respect to only the predetermined ion.

* * * * *